United States Patent
Saguchi

(10) Patent No.: US 12,414,561 B2
(45) Date of Patent: Sep. 16, 2025

(54) SUSTAINED-RELEASE PHEROMONE PREPARATION

(71) Applicant: Shin-Etsu Chemical Co., Ltd., Tokyo (JP)

(72) Inventor: Ryuichi Saguchi, Joetsu (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 17/994,217

(22) Filed: Nov. 25, 2022

(65) Prior Publication Data

US 2023/0165247 A1    Jun. 1, 2023

(30) Foreign Application Priority Data

Nov. 26, 2021   (JP) .................................. 2021-192044

(51) Int. Cl.
| | |
|---|---|
| *A01N 25/34* | (2006.01) |
| *A01N 25/10* | (2006.01) |
| *A01N 37/02* | (2006.01) |
| *A01P 23/00* | (2006.01) |

(52) U.S. Cl.
CPC ............. *A01N 25/34* (2013.01); *A01N 25/10* (2013.01); *A01N 37/02* (2013.01); *A01P 23/00* (2021.08)

(58) Field of Classification Search
CPC ........ A01N 25/34; A01N 25/10; A01N 37/02; A01P 23/00
See application file for complete search history.

(56) References Cited

U.S. PATENT DOCUMENTS

| | | | |
|---|---|---|---|
| 4,600,146 A | 7/1986 | Ohno | |
| 2016/0310715 A1* | 10/2016 | Lee | ............ A61L 31/16 |

FOREIGN PATENT DOCUMENTS

| | | | |
|---|---|---|---|
| EP | 0233109 A2 | * | 8/1987 |
| JP | 57-156403 A | | 9/1982 |
| JP | 62-122801 A | | 6/1987 |
| JP | 62-122801 U | | 8/1987 |
| JP | 10-17407 A | | 1/1998 |
| JP | 11-225646 A | | 8/1999 |
| JP | H11225646 A | * | 8/1999 |
| JP | 1406291 S | | 1/2011 |
| JP | 1471455 S | | 6/2013 |
| JP | 2013188159 A | * | 9/2013 |

OTHER PUBLICATIONS

Machine translation for JPH11225646A (Year: 1999).*
Machine translation for JP2013188159A (Year: 2013).*
Machine translation for JPH11225646A W (Year: 1999).*
Extended European Search Report for European Application No. 22209412.0, dated Apr. 6, 2023.

* cited by examiner

*Primary Examiner* — Robert A Wax
*Assistant Examiner* — John W Lippert, III
(74) *Attorney, Agent, or Firm* — Birch, Stewart, Kolasch & Birch, LLP

(57) ABSTRACT

Provided is a sustained-release pheromone preparation that can be easily installed and stably retained in an installation location, and is comprised of at least one pheromone substance-containing polymer tube with both ends sealed or pheromone substance-containing polymer rod, wherein (a) a closed space is formed in a front view by bending in an arc and crossing the tube or rod, and the preparation is not crossed in a side view;
(b) a curvature radius established is 4 to 17 mm;
(c) a linear distance from a top point of an arc to a crossover point is 25 to 70 mm; and
(d) a repelling force when opening the crossover point to establish a clearance of 20 mm in the front view is 0.5 N or larger.

14 Claims, 7 Drawing Sheets

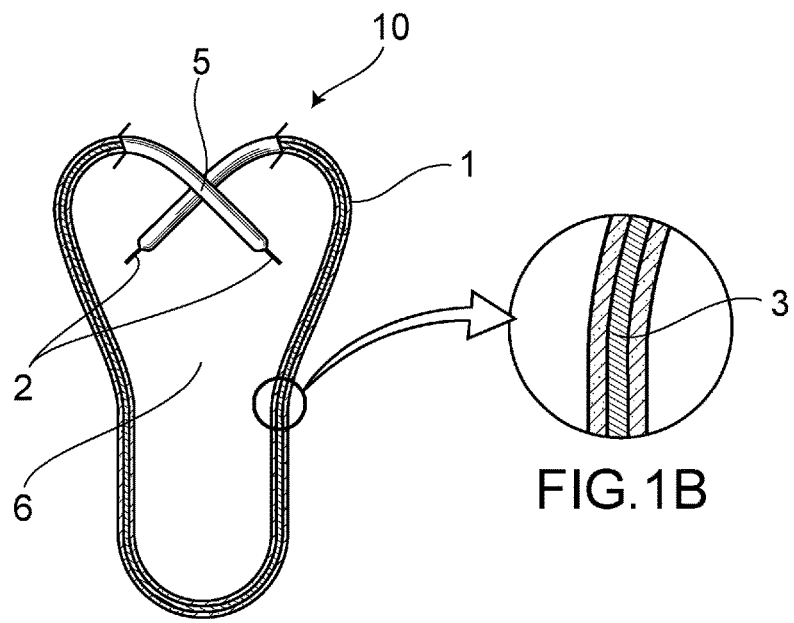
FIG.1A
FIG.1B
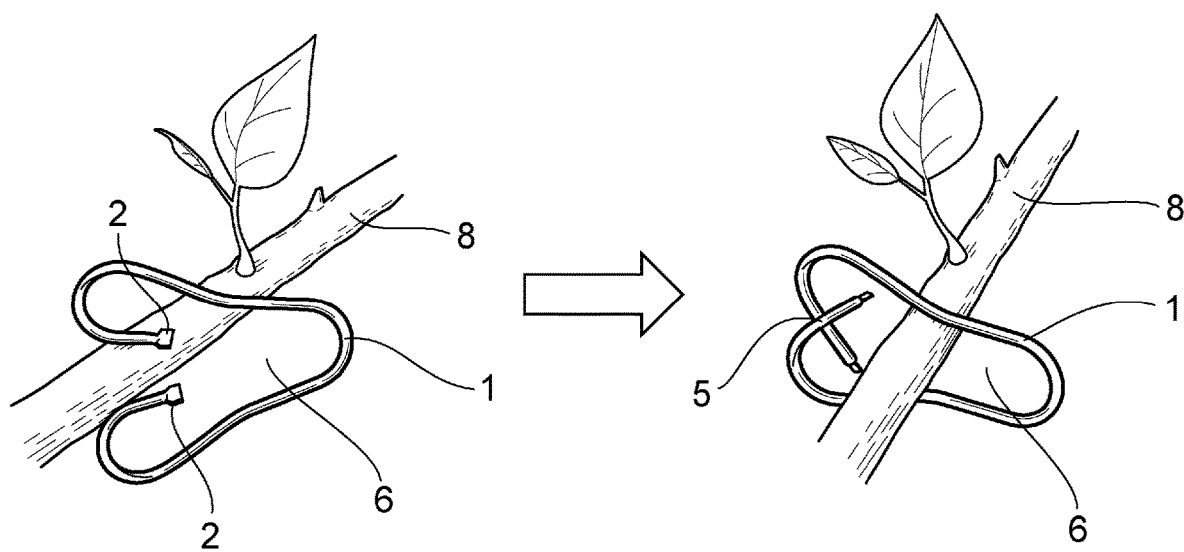
FIG.2A
FIG.2B

SUSTAINED-RELEASE PHEROMONE PREPARATION

BACKGROUND OF THE INVENTION

Field of the Invention

The present invention relates to a sustained-release pheromone preparation.

Background Art

As one method for controlling harmful insects, a mating disruption method has been put into practical use to suppress the density of harmful insects by releasing synthetic sex pheromone substances of the target insects in the air so as to disrupt their mating behaviors and to thereby inhibit the breeding of the next generation. As for control enabled by copulative communication disruption, a pheromone preparation for releasing synthetic sex pheromones should satisfy such a requirement that it is capable of being stably installed for a long term in a predetermined location where the effects of the synthetic sex pheromone substances are expected to be exhibited, and is capable of releasing such synthetic sex pheromone substances significantly gradually and in a continuous manner.

As a sustained-release pheromone preparation developed in view of the above object, a tubular sustained-release pheromone preparation has been proposed, in which a polymer tube is filled with synthetic sex pheromone substances and is sealed at both ends thereof. The tubular sustained-release pheromone preparation has been shown to be able to stably release synthetic sex pheromone substances over a long period of time; however, there is a problem in an approach to stably hold their set up for a long time period without causing any harmful effect and/or damages to the growth of the plants.

As a method for solving this problem, there are known, for example, a sustained-release pheromone preparation with a synthetic sex pheromone substance being contained in a tube made of a polymer material and a metal wire(s) joined (additionally provided) in an axial direction of the tube (JP-A-Sho 57-156403); a type of sustained-release pheromone preparation that is configured in an annular shape with the ends of two polymer tubes being joined together, and is thus capable of being hung on a fruit tree or other trees and the like without adding a metal wire (JP-A-Hei 11-225646); a sustained-release pheromone preparation produced by twisting together two polymer tubes and then joining together both ends thereof, where a holding strength is further improved by utilizing the restoring and repelling forces of the polymer tubes (JP-A-2013-188159); and a sustained-release pheromone preparation of a shape having a loop(s) formed by bending and turning a polymer tube (JP-A-Sho 62-122801 (Utility Model)).

SUMMARY OF THE INVENTION

Since the sustained-release pheromone preparation disclosed in JP-A-Sho 57-156403 is configured to have a metal wire additionally provided therein, it can be installed and stably held due to the shape-retaining property of the metal wire. However, this preparation has shown flaws such as that there are incurred a high production cost and a high filling cost of a synthetic sex pheromone substance due to the usage of the metal wire; that it is somewhat time-consuming to install the preparation as the preparation is to be fixed by twisting the metal wire; that it is troublesome to remove the preparation after use; and that a pruning blade may be damaged by the metal wire when carrying out a pruning operation on a fruit tree or other trees and the like.

Further, while the sustained-release pheromone preparations disclosed in JP-A-Hei 11-225646 and JP-A-2013-188159 can solve the problem of having metal wires remaining in an orchard or the like, they are not yet able to alleviate the troublesomeness in installation as a branch of a fruit tree or other trees has to be inserted through the annular loop, and there are required an operation performed with both hands, or an operation using a dedicated jig or the like.

Further, in the case of the sustained-release pheromone preparation disclosed in JP-A-Sho 62-122801 (Utility Model), at a crossover point of the tube, the tube may be fused, adhered or in contact with each other, or even have a gap that is three times the size of the diameter of the tube or smaller; if the tube is fused or adhered, the loop formed has to be put around a branch of a fruit tree or other trees, which shall impose limitations on the installation location. Further, if the tube is configured to be in contact with each other or have a slight gap therebetween, there is a problem that while the preparation can be hung on a branch of a fruit tree or other trees through such gap, it will fall off due to, for example, natural wind or a wind pressure from an agrochemical sprayer or the like.

In this regard, it is desired that there be developed a sustained-release pheromone preparation that is suitable for controlling the release of a synthetic sex pheromone over a long period of time, can be easily installed and stably retained in an installation location, and requires an inexpensive production cost.

The inventor of the present invention diligently conducted a series of studies to achieve the above object, and completed the invention as follows. That is, the inventor found that by forming a polymer tube or a polymer rod into a given shape, there can be obtained a sustained-release pheromone preparation that is capable of being easily installed and stably retained in an installation location.

According to one embodiment of the present invention, there is provided a sustained-release pheromone preparation comprised of at least one pheromone substance-containing polymer tube with both ends sealed or pheromone substance-containing polymer rod, wherein
  (a) a closed space is formed in a front view by bending in an arc and crossing the polymer tube or polymer rod, and the sustained-release pheromone preparation is not crossed in a side view;
  (b) a curvature radius established by bending in an arc and crossing the polymer tube or polymer rod is 4 to 17 mm;
  (c) a linear distance from a top point of an arc formed by bending the polymer tube or polymer rod in an arc to a crossover point is 25 to 70 mm; and
  (d) a repelling force when opening the crossover point to establish a clearance of 20 mm in the front view is 0.5 N or larger.

Further, according to another embodiment of the present invention, there is provided the above sustained-release pheromone preparation wherein an angle of the arc formed by bending the polymer tube or polymer rod in an arc is 100 to 200°.

Furthermore, according to yet another embodiment of the present invention, there is provided the above sustained-release pheromone preparation wherein the polymer tube or polymer rod is made of polycaprolactone, polybutylene succinate, polyethylene succinate, polybutylene adipate, polyglycolic acid, polylactic acid, polyhydroxy alkanoate, or a copolymer or blended polymer of these polymers.

According to the present invention, there can be provided a sustained-release pheromone preparation that can, while maintaining a release control capability, be easily installed on a fruit tree or other trees and the like, and be stably retained in an installation location without falling off even when exposed to for example a strong natural wind, a wind pressure from an agrochemical distributor or the like and shaking, whereby a reliable sustained release performance can be achieved over a long period of time.

BRIEF DESCRIPTION OF THE DRAWINGS

FIG. 1A is a front cross-sectional view of a working example of the present invention that is comprised of one tube.

FIG. 1B is a partially enlarged view of FIG. 1A.

FIG. 2A is a perspective view illustrating an installation method for installing the preparation shown in FIG. 1A on a tree branch.

FIG. 2B is another perspective view illustrating the installation method for installing the preparation shown in FIG. 1A on the tree branch.

DETAILED DESCRIPTION OF THE INVENTION

At first, the shape of the sustained-release pheromone preparation of the present invention is described, the shape serving as a characteristic of the invention.

As shown in FIG. 1A, the sustained-release pheromone preparation is configured to have a closed space 6 in a front view by bending in an arc(s) and crossing at least one pheromone substance-containing polymer tube or polymer rod.

Figure 3A:
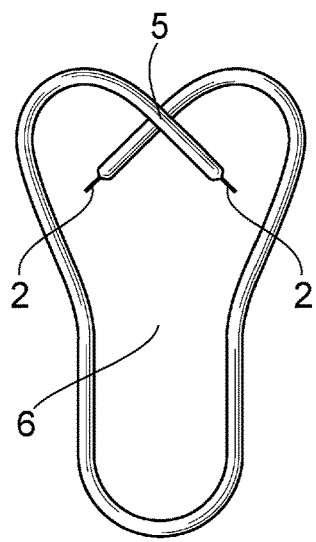
FIG. 3A is a front view of a bell pepper-shaped working example.
Figure 3B:
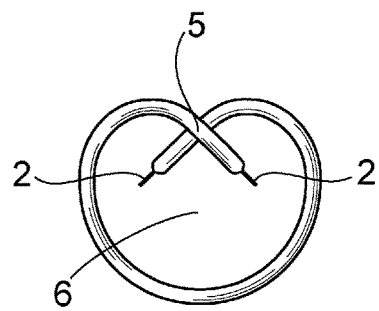
FIG. 3B is a front view of a tomato-shaped working example.
Figure 3C:
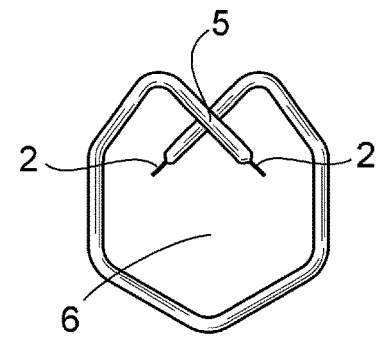
FIG. 3C is a front view of a hexagonal working example.

There are no restrictions on the shape of the closed space so long as it satisfies a later-described curvature radius and linear distance; the closed space may for example have a heart shape shown in FIG. 1A, a bell pepper shape shown in FIG. 3A, a tomato shape shown in FIG. 3B, or a hexagonal shape shown in FIG. 3C. Of these examples, preferred is the heart shape shown in FIG. 1A in that a bended and turned top point therein is of a shape serving as a fulcrum for a repelling force, and that there can be achieved an appropriate strength of a repelling force at the bended and turned portion due to the angle of an arc as described later.

The aforementioned sustained-release pheromone preparation is a sustained-release pheromone preparation that is not crossed in a side view. As shown in FIGS. 2A and 2B, by simply pressing the outer side of a crossover point 5 of the sustained-release pheromone preparation against a branch 8, the branch 8 will pass through the crossover point 5 so as to allow the sustained-release pheromone preparation to be hung on the branch 8 at the site of the closed space 6. The sustained-release pheromone preparation hung on the branch 8 is prevented by the crossover point 5 from falling from the branch 8. The polymer tube or polymer rod may be in contact with itself in the side view, or may form such a slight gap in the side view that it will not contribute to falling. A poor workability in an installation and collection operations will be exhibited if the crossover point 5 is crossed in the side view, fused or bonded. Since this sustained-release pheromone preparation is not crossed in the side view, the installation and collection operations can for example be easily performed with one hand, thus contributing to an improvement in work efficiency.

A curvature radius established by bending in an arc and crossing the polymer tube or polymer rod is 4 to 17 mm, preferably 6 to 15 mm, more preferably 6 to 12.5 mm. It is not appropriate if the curvature radius is smaller than 4 mm, because at the time of performing a bending and turning processing on the tube or rod, the tube or rod may break as a result of exceeding their ranges of elastic deformation. Meanwhile, it is not practical if the curvature radius is greater than 17 mm, because the repelling force will be impaired.

Figures 4A, 4B:
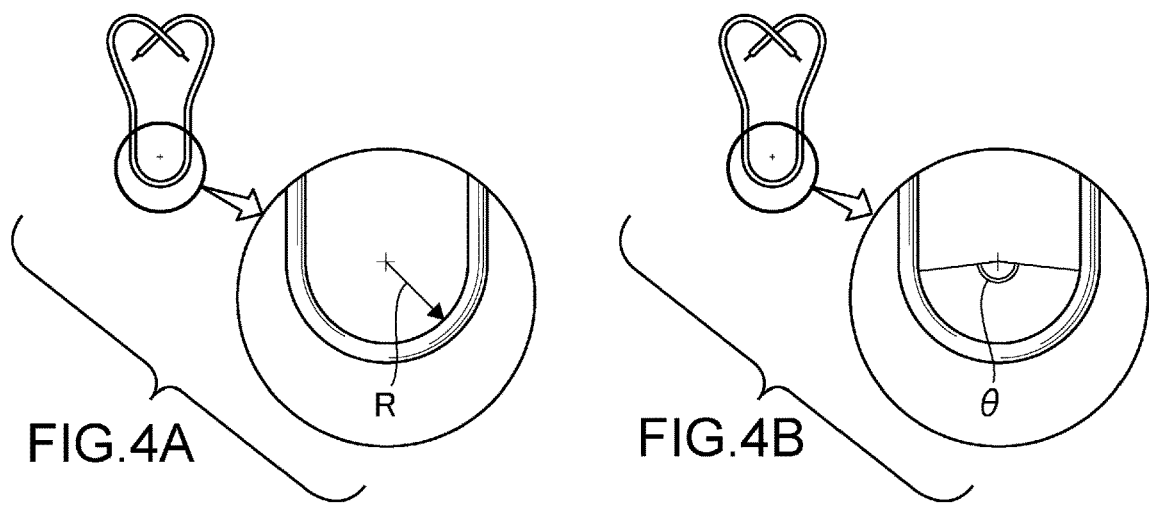
FIG. 4A is a front view showing the details of a heart-shaped working example, particularly a curvature radius thereof.
FIG. 4B is a front view showing the details of the heart-shaped working example, particularly an angle of an arc thereof.

Here, as shown in FIG. 4A, the curvature radius refers to a radius R of an arc formed by bending the tube or rod in an arc.

A linear distance D from a top point 7 of an arc formed by bending the polymer tube or rod in an arc to the crossover point 5 is 25 to 70 mm, preferably 25 to 65 mm, more preferably 25 to 60 mm. It is not economical If this linear distance is shorter than 25 mm, because the entire length of the tube or rod will be 100 mm or shorter. A lack in installation stability will be observed if the linear distance is greater than 70 mm, because a repelling force cannot be achieved at the portion of the crossover point 5 even when employing a tube or rod having a certain level of rigidity.

Figure 4C:
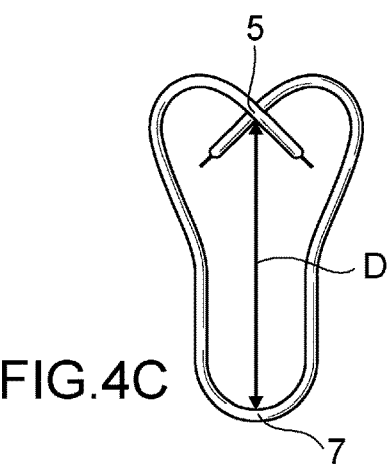
FIG. 4C is a front view showing the details of the heart-shaped working example, particularly a linear distance from a top point of the arc to a crossover point.

Here, as shown in FIG. 4C, the linear distance refers to the distance D from the inner side of the top point 7 of the arc formed by bending the tube or rod in an arc to the center of the crossover point 5.

Next, the repelling force of the sustained-release pheromone preparation is described.

In the present invention, assuming that the preparation is to be actually installed on and then collected from a branch or the like, evaluated was a repelling force when opening the crossover point to establish a clearance of 20 mm in the front view. The actual use of a sustained-release pheromone preparation is such that it is installed outdoors or the like over a long period of time starting from immediately before the emergence of a target harmful insect(s) on plant bodies, poles and the like in a field until the end of the emergence thereof. The sustained-release pheromone preparation should not fall off during such period due to, for example, natural phenomena such as rains and winds, and machine-aided agricultural tasks such as agrochemical spraying, picking and pruning. For this reason, the repelling force is 0.5 N or larger, preferably 0.6 N or larger.

A method for measuring such repelling force is described hereunder.

Figure 5A:
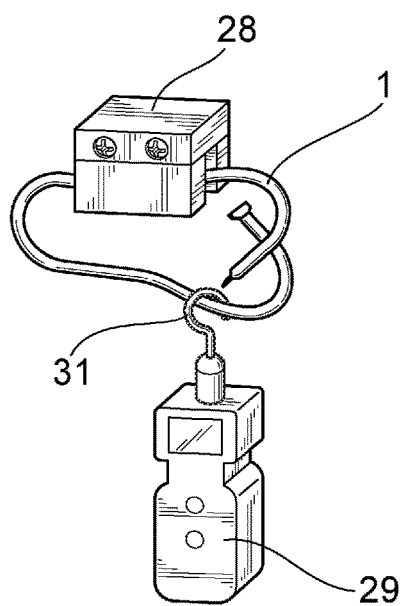
FIG. 5A is a perspective view illustrating a repelling force measurement method, particularly a standby state of the method.
Figure 5B:
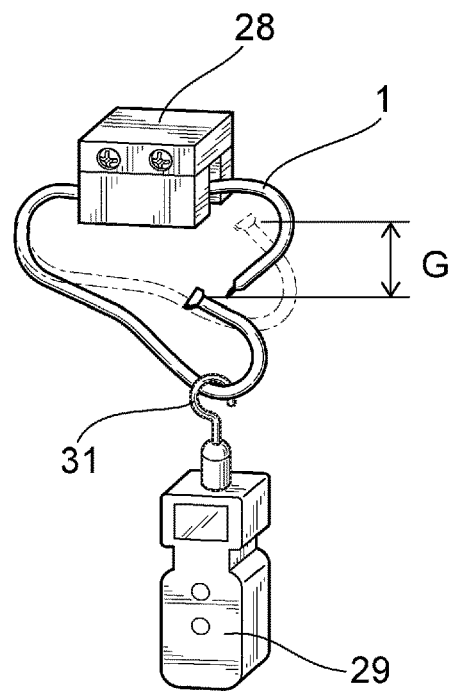
FIG. 5B is a perspective view illustrating the repelling force measurement method, particularly a state of the method where an external force is being applied.

As shown in FIGS. 5A and 5B, the measurement of the repelling force as an index is conducted in a manner where one part of the sustained-release pheromone preparation that has been subjected to the bending and turning processing is to be horizontally fixed by a metal chuck 28, and a force gauge 29 (DST-20N by IMADA CO., LTD.) is to be hung from the other part of the preparation that has been subjected to the bending and turning processing via a small hook 31 as an attachment, followed by keeping pulling the force gauge 29 downward until a clearance G at the crossover point has reached 20 mm while making sure that the polymer tube or rod will not be apart from each other in the side view. A peak value at that time was measured as the repelling force.

In terms of maintaining a favorable repelling force, it is preferred that the angle of the arc formed by bending the polymer tube or rod in an arc be 100 to 200°, more preferably 110 to 180°, even more preferably 120 to 170°.

Here, as shown in FIG. 4B, the angle of the arc refers to an angle $\theta$ formed by bending the tube or rod in an arc.

Next, the polymer tube or rod is described.

The polymer tube is a tube filled with a pheromone substance and whose both ends are sealed.

Although the inner diameter of the polymer tube varies depending on the pheromone substance required per each preparation, in terms of formability of the preparation or filling the tube with a sex pheromone, it is preferred that the inner diameter thereof be 0.2 to 3 mm, more preferably 0.3 to 2.0 mm. In terms of maintaining an easiness in processing and a favorable repelling force, it is preferred that the wall thickness of the tube be 0.15 to 1.5 mm, more preferably 0.3 to 0.8 mm. In terms of maintaining an easiness in processing and a favorable repelling force, it is preferred that the outer diameter of the tube that encompasses the inner diameter and wall thickness thereof be 1.5 to 6 mm.

The polymer rod is, for example, one prepared by kneading a pheromone substance or a pheromone substance-supported inorganic filler into a later-described polymer material, or one prepared by impregnating such polymer material with a pheromone substance.

In terms of maintaining an easiness in processing and a favorable repelling force, it is preferred that the diameter of the rod be identical to the outer diameter of the polymer tube, which is 1.5 to 6.0 mm.

The supporting amount of the pheromone substance in the polymer tube if injecting pheromone substance into the polymer tube is preferably 50 to 600 mg, more preferably 80 to 500 mg, when the effective length is L 200 mm as the most common effective length. If the supporting amount is smaller than 50 mg, the amount of the pheromone liquid released during the installation period will be insufficient whereby a controlling effect on harmful insects by mating disruption may be impaired. Meanwhile, a supporting amount of larger than 600 mg leads to an excess capacitance whereby the pheromone may remain and thus be wasted even after the emergence period of harmful insects has elapsed. Here, even in a case where a pheromone substance is diluted with a solvent before use so as to control the release amount thereof, the preferable supporting amount of the pheromone substance is within the above range(s).

The contained amount of the pheromone substance in the polymer rod if kneading a pheromone liquid into the polymer rod is preferably 50 to 600 mg, more preferably 80 to 500 mg, when the effective length is L 200 mm. Further, it is preferred that the pheromone substance in the polymer rod be contained at a ratio of 2 to 60% by mass, more preferably 2 to 40% by mass, per a total mass of the polymer rod including the pheromone substance. If the pheromone substance is contained at a ratio of smaller than 2% by mass, there may not be secured a sufficient releasing speed; if the pheromone substance is contained at a ratio of larger than 60% by mass, release control may not be exercised in a sufficient manner.

The pheromone substance may be a natural pheromone substance extracted and separated from a harmful insect; a synthetic pheromone substance is preferred in terms of, for example, cost and availability in a large quantity.

There are no particular limitations on the shape of the cross-section of the polymer tube or rod; the cross-section thereof may have various shapes.

Figures 9C, 9D:
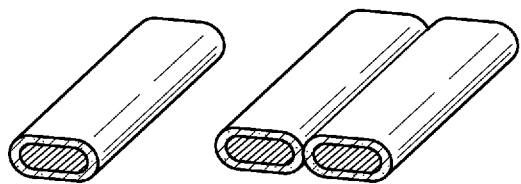
FIG. 9C is a perspective view of a tube having a particular cross-section in one working example, specifically a rectangular tube.
FIG. 9D is a perspective view of a tube having a particular cross-section in one working example, specifically another type of rectangular tube.
Figures 9A, 9B:
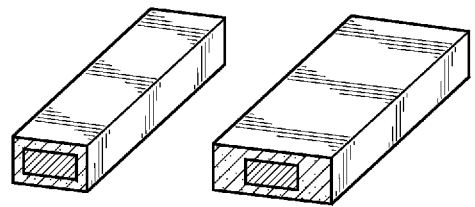
FIG. 9A is a perspective view of a tube having a particular cross-section in one working example, specifically an oval tube.
FIG. 9B is a perspective view of tubes having particular cross-sections in one working example, specifically oval tubes.

As for the polymer tube, the cross-section thereof may for example have a circular shape, an oval shape shown in FIGS. 9A and 9B, or a rectangular shape shown in FIGS. 9C and 9D; it is advantageous if the cross-section has an oval or rectangular shape, because a larger repelling force can be achieved after processing.

Figure 8A:
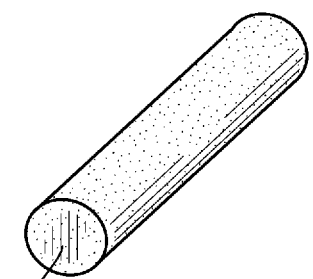
FIG. 8A is a perspective view of a rod having a particular cross-section in one working example, specifically a cylindrical rod.
Figure 8B:
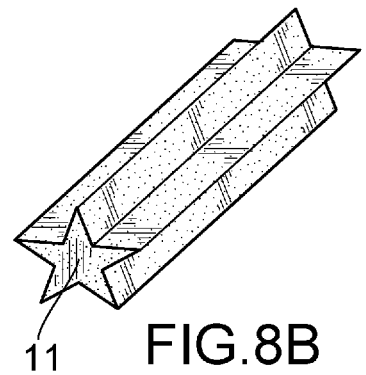
FIG. 8B is a perspective view of a rod having a particular cross-section in one working example, specifically a star-shaped rod.
Figure 8C:
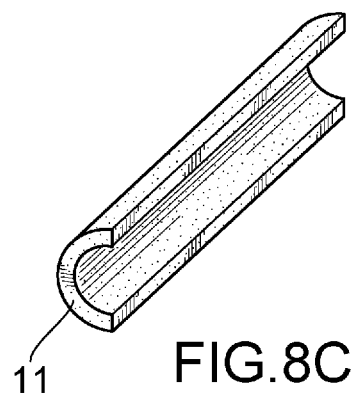
FIG. 8C is a perspective view of a rod having a particular cross-section in one working example, specifically a semi-tubular rod.

Further, as for the polymer rod, the cross-section thereof may for example have a circular shape shown in FIG. 8A, a star shape shown in FIG. 8B, or a hollow circular shape shown in FIG. 8C.

The polymer tube or rod needs to have a length of at least 100 mm in order to form, for example, a heart-shaped, bell pepper-shaped or tomato-shaped closed space; in terms of installation stability and easiness in installation and collection, it is preferred that the polymer tube or rod have a length of 100 to 400 mm, more preferably 150 to 300 mm. A length of greater than 400 mm is not preferable, because when processing a tube or rod-like object of such length, the linear distance from the top point of the arc to the crossover point will be excessively long whereby not only installation will be burdensome, but a required repelling force cannot be achieved.

The polymer material making up the polymer tube or rod used in the sustained-release pheromone preparation is preferably, for example, polycaprolactone, polybutylene succinate, polyethylene succinate, polybutylene adipate, polyglycolic acid, polylactic acid, polyhydroxy alkanoate, or a copolymer(s) of these polymers. Here, any one of these polymer materials may be used alone, or two or more of them may be used in a mixed manner.

As is the case with the polymer tube or rod molded into an elongated shape having a relatively small outer diameter, the molded product needs to possess a repelling force in order to be hung from and retained on a fruit tree or other trees and the like. A preparation processed by bending, in an arc(s), a thermoplastic resin such as polyethylene, an ethylene-vinyl acetate copolymer and polyvinyl chloride is not suitable, because such preparation undergoes plastic deformation instead of elastic deformation, whereby as a result of opening the portion of the crossover point to hang the preparation on a tree or the like, the preparation will not be restored to its original shape with the crossover point remaining opened. The abovelisted polymer materials are suitable in terms of elastic deformation property of the molded product. Of the above examples, in terms of easiness in processing, particularly preferred are polybutylene succinate, polybutylene adipate, and polybutylene succinate adipate.

Figure 7A:
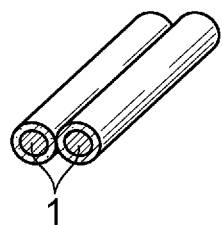
FIG. 7A is a perspective view of two tubes that are aligned in parallel.
Figure 7B:
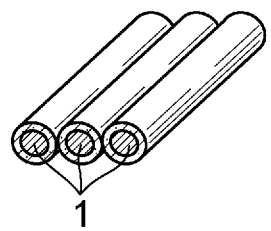
FIG. 7B is a perspective view of three tubes that are aligned in parallel.
Figure 7C:
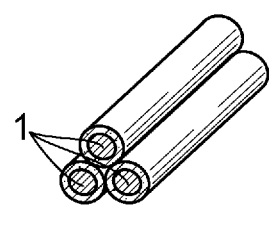
FIG. 7C is a perspective view of three tubes that are stacked and combined together.
Figure 7D:
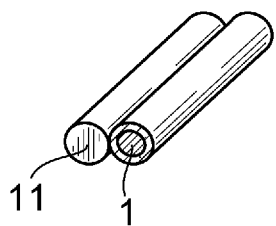
FIG. 7D is a perspective view of a rod and a tube that are provided in a combined manner.
Figure 7E:
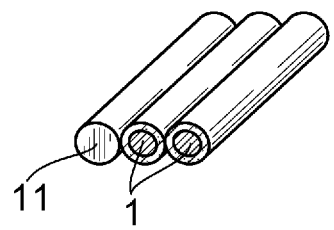
FIG. 7E is a perspective view of a rod and two tubes that are provided in a combined manner.
Figure 7F:
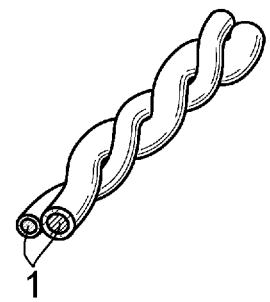
FIG. 7F is a perspective view of two tubes that are twisted together.

As for the polymer tube or rod making up the sustained-release pheromone preparation, there is required at least one; however, as shown in FIGS. 7A and 7B, there may for example be employed a configuration where two or three polymer tubes 1 are aligned in parallel. Further, as shown in FIG. 7C, there may also be employed a configuration where three polymer tubes 1 are stacked and combined together. Furthermore, as shown in FIGS. 7D and 7E, there may also be employed a configuration where the polymer tube 1 and a polymer rod 11 are provided in a combined manner. Here, in the configuration where the polymer tube 1 and the polymer rod 11 are provided in a combined manner as shown in FIGS. 7D and 7E, in terms of easiness in processability when there is a need to save the pheromone supporting amount per each sustained-release pheromone preparation, or when the repelling force cannot be achieved with one tube or rod, there may also be employed a mode where a polymer rod containing no pheromone substance and a polymer tube are provided in a combined manner. Also, depending on the type of the pheromone substance as well as the type of the target harmful insect(s), there may be required multiple polymer tubes or rods of different materials and different dimensions such as inner and outer diameters; in such case, for example as shown in FIG. 7F, a product with multiple polymer tubes 1 being twisted together may be used for processing.

The pheromone substance may also be a solid pheromone substance other than a pheromone substance liquid at 25° C. and a pheromone liquid-containing support.

Specific examples of the pheromone substance used in the present invention include Z,Z-7,11-hexadecadienyl acetate and Z,E-7,11-hexadecadienyl acetate as sex pheromones of the pink bollworm (*Pectinophora gossypiella*), Z-8-dodecenyl acetate as a sex pheromone of the Oriental fruit moth (*Grapholita molesta*), E-5-decenyl acetate as a sex pheromone of the peach twig borer (*Anarsia lineatella*), Z-9-dodecenyl acetate as a sex pheromone of the grape berry moth (*Eupoecilia ambiguella*), E,Z-7,9-dodecadienyl acetate as a sex pheromone of the European grape vine moth (*Lobesia botrana*), E-11-tetradecenyl acetate as a sex pheromone of the light brown apple moth (*Epiphyas postvittana*), E,E-8,10-dodecadienol as a sex pheromone of the codling moth (*Cydia pomonella*), Z-11-tetradecenyl acetate as a sex pheromone of the leaf roller (Tortricidae), Z,Z-3,13-octadecadienyl acetate and E,Z-3,13-octadecadienyl acetate as sex pheromones of the peach tree borer (*Synanthedon exitiosa*), Z-11-hexadecenal as a sex pheromone of the American bollworm (*Helicoverpa armigera*), Z-9-hexadecenal as a sex pheromone of the oriental tobacco budworm (*Heliothis assulta*), E,E-8,10-dodecadienyl acetate as a sex pheromone of the soybean pod borer (*Leguminivora glycinivorella*), Z-11-hexadecenyl acetate and Z-11-hexadecenal as sex pheromones of the diamondback moth (*Plutella xylostella*), Z-11-hexadecenyl acetate, Z-11-hexadecenol and n-hexadecyl acetate as sex pheromones of the cabbage armyworm (*Mamestra brassicae*), Z, E-9,12-tetradecadienyl acetate and Z-9-tetradecenol as sex pheromones of the beat armyworm (*Spodoptera exigua*), Z,E-9,11-tetradecadienyl acetate and Z,E-9,12-tetradecadienyl acetate as sex pheromones of the common cutworm (*Spodoptera litura*), Z-9-tetradecenyl acetate as a sex pheromone of the fall armyworm, E-4-tridecenyl acetate as a sex pheromone of the tomato pinworm, Z-11-hexadecenal and Z-13-octadecenal as sex pheromones of the rice stem borer (*Scirpophaga incertulas, Chilo suppressalis*), 5,9-dimethylpentadecane and 5,9-dimethylhexadecane as sex pheromones of the coffee leaf miner, 14-methyl-1-octadecene as a sex pheromone of the peach leaf miner (*Lyonetia clerkella* L.), Z-7-icosen-11-one as a sex pheromone of the peach fruit moth (*Carposina sasakii*), 7,8-epoxy-2-methyloctadecane as a sex pheromone of the gypsy moth (*Lymantria dispar*), Z-13-hexadecen-11-ynyl acetate as a sex pheromone of the pine processionary moth, 2-butanol as a sex pheromone of the *Dasylepida ishigakiensis*, Z-7,15-hexadecadien-4-olide as a sex pheromone of the yellowish elongate chafer (*Heptophylla picea*), n-dodecyl acetate as a sex pheromone of the sugarcane wireworm (*Melanotus okinawensis*), E-9,11-dodecadienyl butyrate and E-9,11-dodecadienyl hexanate as sex pheromones of the sugarcane wireworm (*Melanotus sakishimensis*), (R)-Z-5-(oct-1-enyl)-oxacyclopentan-2-one as a sex pheromone of the cupreous chafer (*Anomala cuprea*), hexyl hexanoate, E-2-hexenyl hexanoate and octyl butyrate as sex pheromones of the rice leaf bug (*Trigonotylus caelestialium*), hexyl butyrate, E-2-hexenyl butyrate and E-4-oxo-2-hexenal as sex pheromones of the sorghum plant bug (*Stenotus rubrovittatus*), 6R-Z-3,9-dimethyl-6-isopropenyl-3,9-decadienyl propionate and 6R-Z-3,9-dimethyl-6-isopropenyl-3,9-decadienol as sex pheromones of the white peach scale (*Pseudaulacaspis pentagona*), S-5-methyl-2-(1- propen yl)-4-hexenyl 3-methyl-2-butenoate as a sex pheromone of the vine mealybug (*Planococcus ficus*), Z-9-tricosene as a sex pheromone of the housefly (*Musca domestica*), gentisyl quinone isovalerate as a sex pheromone of the German cockroach (*Blattella germanica*), and olean as a sex pheromone of the olive fruit fly (*Bactrocera oleae*).

In addition, examples of the pheromone substance used in the present invention may also include a spiroacetal, an aliphatic linear aldehyde, an aliphatic linear acetate that is saturated or has one or more double bonds, an aliphatic linear alcohol, an aliphatic linear ketone, an aliphatic hydrocarbon, and a carboxylic acid.

Specific examples of the spiroacetal include 1,6-dioxaspiro[4.5]decane, 2-ethyl-1,6-dioxaspiro[4.4]nonane, 3-hydroxy-1,7-dioxaspiro[5.5]undecane, 4-hydroxy-1,7-dioxaspiro[5.5]undecane, 7-methyl-1,6-dioxaspiro[4.5]decane, 2-methyl-1,6-dioxaspiro[4.5]decane, 1,7-dioxaspiro[5.5]undecane, 2,7-dimethyl-1,6-dioxaspiro[4.4]nonane, 2,4,8-trimethyl-1,7-dioxaspiro[5.5]undecane, 2-methyl-1,7-dioxaspiro[5.5]undecane, 1,7-dioxaspiro[5.6]dodecane, 2,8-dimethyl-1,7-dioxaspiro[5.5]undecane, 2,2,8-trimethyl-1,7-dioxaspiro[5.5]undecane, 2-ethyl-1,7-dioxaspiro[5.5]undecane, 2-methyl-1,7-dioxaspiro[5.6]dodecane, 2-ethyl-7-methyl-1,7-dioxaspiro[5.6]decane, 7-ethyl-2-methyl-1,6-dioxaspiro[5.6]decane, 2,7-diethyl-1,6-dioxaspiro[4.4]nonane, 2,7-dimethyl-1,6-dioxaspiro[4.6]undecane, 2-methyl-7-propyl-1,6-dioxaspiro[4.4]nonane, 3-hydroxy-2,8-dimethyl-1,7-dioxaspiro[5.5]undecane, 2-propyl-1,7-dioxaspiro[5.5]undecane, 2-ethyl methyl-1,7-dioxaspiro[5.5]undecane, 8-ethyl-2-methyl-1,7-dioxaspiro[5.5]undecane, 2,7-diethyl-1,6-dioxaspiro[4.5]decane, 2,7-dipropyl-1,6-dioxaspiro[4.4]nonane, 7-butyl-2-methyl-1,6-dioxaspiro[4.5]decane, 8-methyl-2-propyl-1,7-dioxaspiro[5.5]undecane, and 2-propyl methyl-1,7-dioxaspiro[5.5]undecane.

It is preferred that the aliphatic linear aldehyde have 10 to 18 carbon atoms. Specific examples of such aliphatic linear aldehyde having 10 to 18 carbon atoms include Z-5-decenal, 10-undecenal, n-dodecanal, Z-9-dodecenal, E5Z10-dodecadienal, E8E10-dodecadienal, n-tetradecanal, Z7-tetradecenal, Z9-tetradecenal, Z11-tetradecenal, Z9E11-tetradecadienal, Z9Z11-tetradecadienal, Z9E12-tetradecadienal, Z9E11,13-tetradecatrienal, Z10-pentadecenal, E9Z11-pentadecadienal, n-hexadecanal, Z7-hexadecenal, E6Z11-hexadecadienal, E4Z6-hexadecadienal, E4E6Z11-hexadecatrienal, E10E12E14-hexadecatrienal, n-octadecanal, Z9-octadecenal, E14-octadecenal, E2Z13-octadecadienal, Z3Z13-octadecadienal, Z9Z12-octadecadienal, and Z9Z12Z15-octadecatrienal.

It is preferred that the aliphatic linear acetate that is saturated or has one or more double bonds have 12 to 20 carbon atoms. Specific examples of the aliphatic linear acetate that is saturated or has one double bond, and has 12 to 20 carbon atoms, include decyl acetate, Z3-decenyl acetate, Z4-decenyl acetate, undecyl acetate, Z7-undecenyl acetate, Z8-undecenyl acetate, E9-undecenyl acetate, dodecyl acetate, E7-dodecenyl acetate, Z7-dodecenyl acetate, E8-dodecenyl acetate, E9-dodecenyl acetate, 11-dodecenyl acetate, 10-methyldodecenyl acetate, tridecyl acetate, Z4-tridecenyl acetate, E6-tridecenyl acetate, E8-tridecenyl acetate, Z8-tridecenyl acetate, tetradecyl acetate, Z7-tetradecenyl acetate, E8-tetradecenyl acetate, Z8-tetradecenyl acetate, E9-tetradecenyl acetate, Z9-tetradecenyl acetate, E10-tetradecenyl acetate, Z10-tetradecenyl acetate, E12-tetradecenyl acetate, Z12-tetradecenyl acetate, 12-methyltetradecenyl acetate, pentadecyl acetate, Z8-pentadecenyl acetate, E9-pentadecenyl acetate, hexadecyl acetate, Z3-hexadecenyl acetate, Z5-hexadecenyl acetate, E6-hexadecenyl acetate, Z7-hexadecenyl acetate, Z9-hexadecenyl acetate, Z10-hexadecenyl acetate, Z12-hexadecenyl acetate, heptadecyl acetate, Z11-heptadecenyl acetate, octadecyl acetate, E2-octadecenyl acetate, Z11-octadecenyl acetate, and E13-octadecenyl acetate.

Specific and preferable examples of the aliphatic linear acetate that has two or more double bonds and has 12 to 20 carbon atoms, may include conjugated diene and/or 1,4-pentadiene-based acetate compounds. More specifically, there may be listed, for example, Z3E5-decadienyl acetate, Z3E5-dodecadienyl acetate, E3Z5-dodecadienyl acetate, Z5E7-dodecadienyl acetate, E5Z7-dodecadienyl acetate, Z9Z9-dodecadienyl acetate, Z8Z10-dodecadienyl acetate, 9,11-dodecadienyl acetate, E4Z7-tridecadienyl acetate, 11-methyl-Z9,12-tridecadienyl acetate, E3E5-tetradecadienyl acetate, E8E10-tetradecadienyl acetate, Z10Z12-tetradecadienyl acetate, Z10E12-tetradecadienyl acetate, E10Z12-tetradecadienyl acetate, E10E12-tetradecadienyl acetate, E11Z13-tetradecadienyl acetate, Z8Z10-pentadecadienyl acetate, Z8E10-pentadecadienyl acetate, Z8Z10-hexadecadienyl acetate, Z10E12-hexadecadienyl acetate, Z11Z13-hexadecadienyl acetate, Z11E13-hexadecadienyl acetate, E11Z13-hexadecadienyl acetate, and Z11E14-hexadecadienyl acetate.

It is preferred that the aliphatic linear alcohol have 7 to 20 carbon atoms. Specific and preferable examples of the aliphatic linear alcohol having 7 to 20 carbon atoms include saturated aliphatic linear alcohols, or aliphatic linear alcohols having one or at least two double bonds. More specifically, there may be listed, for example, n-heptanol, Z4-heptenol, Z6-nonenol, Z6,8-nonadienol, E6,8-nonadienol, n-decanol, Z5-decenol, E5-decenol, n-undecanol, undecenol, 11-chloro-E8E10-undecadienol, n-dodecanol, Z5-dodecenol, Z7-dodecenol, E7-dodecenol, Z8-dodecenol, E8-dodecenol, Z9-dodecenol, E9-dodecenol, E10-dodecenol, 11-dodecenol, Z5E7-dodecadienol, E5Z7-dodecadienol, E5E7-dodecadienol, Z7Z9-dodecadienol, Z7E9-dodecadienol, E7Z9-dodecadienol, 8,9-difluoro-E8E10-dodecadienol, 10,11-difluoro-E8E10-dodecadienol, 8,9,10,11-tetrafluoro-E8E10-dodecadienol, Z9,11-dodecadienol, E9,11-dodecadienol, n-tridecanol, n-tetradecanol, Z5-tetradecenol, E5-tetradecenol, Z7-tetradecenol, Z8-tetradecenol, Z11-tetradecenol, E11-tetradecenol, Z9Z11-tetradecadienol, Z9E11-tetradecadienol, Z9Z12-tetradecadienol, Z9E12-tetradecadienol, Z10Z12-tetradecadienol, E10E12-tetradecadienol, n-pentadecanol, 6,10,14-trimethyl-2-pentadecanol, n-hexadecanol, Z9-hexadecenol, Z11-hexadecenol, E11-hexadecenol, Z7Z11-hexadecadienol, Z7E11-hexadecadienol, E10Z12-hexadecadienol, E10E12-hexadecadienol, Z11Z13-hexadecadienol, Z11E13-hexadecadienol, E11Z13-hexadecadienol, E11Z13-hexadecadienol, Z13-hexadec-11-en-ol, E4Z6Z10-hexadecatrienol, E4E6Z10-hexadecatrienol, n-octadecanol, Z13-octadecenol, E2Z13-octadecadienol, Z3Z13-octadecadienol, E3Z13-octadecadienol, and n-eicosanol.

It is preferred that the aliphatic linear ketone have 10 to 20 carbon atoms. Examples of the aliphatic linear ketone having 10 to 20 carbon atoms include heptadecan-2-one, Z12-nonadecen-9-one, Z6Z9-nonadecadien-3-one, Z7-nonadecen-11-one, Z7-eicosen-11-one, Z6-heneicosen-11-one, Z6-heneicosen-9-one, Z6E8-heneicosadien-11-one, Z6E9-heneicosadien-11-one, Z6Z9-heneicosadien-11-one, and Z7-tricosen-11-one.

It is preferred that the aliphatic hydrocarbon have 10 to 20 carbon atoms. Specific examples of the aliphatic hydrocarbon having 10 to 20 carbon atoms include 1E11-pentadecadiene, 1Z11-pentadecadiene, 5,9-dimethylpentadecane, 2-methylhexadecane, 3,13-dimethylhexadecane, 5,9-dimethylhexadecane, n-heptadecane, 2-methylheptadecane, 2,5-dimethylheptadecane, 5-methylheptadecane, 5,11-dimethylheptadecane, 7-methylheptadecane, 7,11-dimethylheptadecane, Z3Z6Z9-heptadecatriene, Z6Z9-heptadecadiene, Z7-octadecene, 10,14-dimethyl-1-octadecene, 5,9-dimethyloctadecane, 2-methyloctadecane, 14-methyloctadecane, Z3Z6Z9-octadecatriene, n-nonadecane, 2-methylnonadecane, 9-methylnonadecane, Z3Z6Z9Z11-nonadecatetraene, 1E3Z6Z9-nonadecatetraene, Z3Z6Z9-nonadecatriene, Z6Z9-nonadecadiene, Z9-nonadecene, n-eicosane, Z9-eicosene, Z3Z6-eicosadiene, Z3Z6Z9-eicosatriene, 1Z3Z6Z9-eicosatetraene, 1Z3Z6Z9-heneicosatetraene, n-heneicosane, Z3Z6-heneicosadiene, Z6Z9-heneicosadiene, Z6Z9,20-heneicosatriene, Z3Z6Z9-heneicosatriene, Z6-13-methylheneicosene, Z9-heneicosene, n-docosene, Z3Z6Z9-docosatriene, Z6Z9-docosadiene, n-tricosane, Z3Z6Z9-tricosatriene, Z6Z9-tricosadiene, n-tetracosane, n-pentacosane, Z3Z6Z9-pentacosatriene, n-hexacosane, n-heptacosane, n-octacosane, and n-nonacosane.

There are no particular limitations on the carboxylic acid so long as it is a compound having a carboxyl group; it is preferred that the carboxylic acid have 10 to 20 carbon atoms. Specific examples of the carboxylic acid having 10 to 20 carbon atoms include those having multiple methyl groups in the carbon skeleton, and those having double bonds. More specifically, there may be listed, for example, 3,5-dimethyldodecanoic acid, Z-5-undecenoic acid, E-5-undecenoic acid, and (E, Z)-3,5-tetradecadienoic acid.

If necessary, an additive(s) such as an antioxidant and an ultraviolet absorber may be added to the pheromone substance.

Examples of the antioxidant include 2,6-di-tert-butyl-4-methylphenol (BHT), butylhydroxytoluene, butylhydroxyanisole, hydroquinone, 2,2'-methylenebis(4-methyl-6-t-butylphenol), and vitamin E.

Examples of the ultraviolet absorber include 2-(2'-hydroxy-3'-tert-butyl-5'-methylphenyl)-5-chlorobenzotriazole (HBMCBT), 2-hydroxy-4-octoxybenzophenone, 2-(3,5-di-t-butyl-2-hydroxyphenyl)-5-chlorobenzotriazole, and 2,5-di-t-butylhydroquinone.

Described hereunder is a method for producing the sustained-release pheromone preparation of the present invention.

Figure 13:
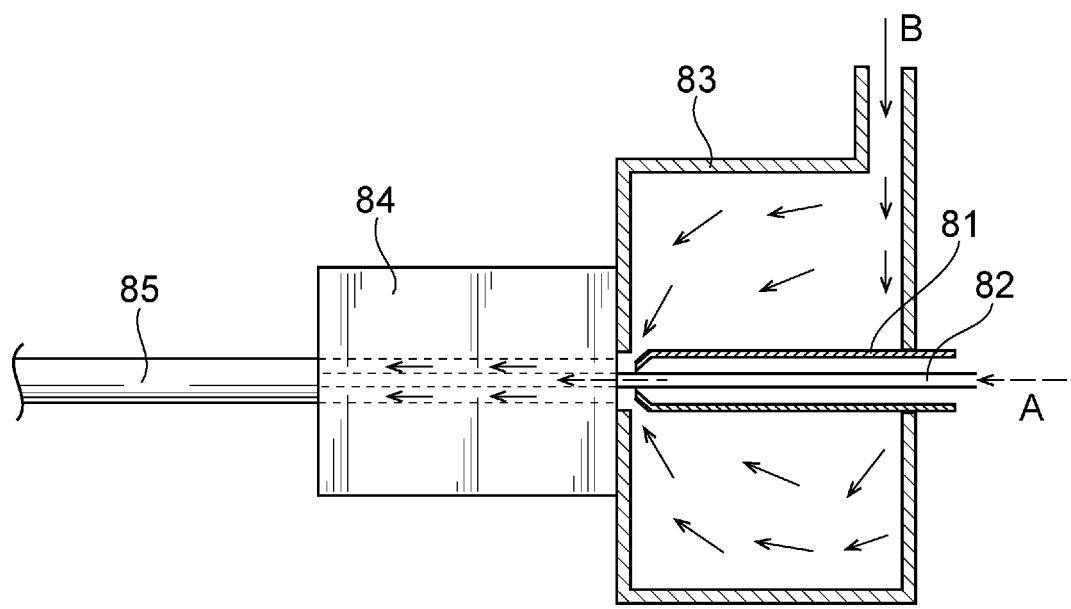
FIG. 13 is a cross-sectional view showing how a polymer tube is formed by extrusion molding.

At first, there is prepared a polymer tube with a pheromone substance being encapsulated therein; or a polymer rod with a pheromone substance being kneaded thereinto. The polymer tube is obtained by extruding a polymer material into the shape of a tube, and injecting and encapsulating the pheromone substance thereinto. For example, as shown in FIG. 13, a polymer tube with an unlimited length that is filled with a pheromone liquid A is subjected to extrusion molding in a continuous manner. A polymer tube member 85 is to be formed by extruding a melted polymer material B in a feeder 83 into the shape of a tube from a die 84, where at that time, a synthetic pheromone liquid is continuously injected into the polymer tube member 85 so as to fill the same through a conduit 82 provided in a mandrel 81 of the die, after which the polymer tube member is reeled on a reel. Further, the polymer rod is obtained by mixing and stirring a pheromone liquid or a pheromone liquid-containing support such as a pheromone liquid-containing inactive substance into a polymer material, and then extruding the mixed and stirred product into the shape of a rod. For example, a pheromone liquid or a pheromone liquid-containing support may be dispersed into a melted polymer material, followed by extruding the product thus prepared into the shape of a rod from a die so as to form a polymer rod member before having it reeled on a reel.

There are no particular limitations on the above support, and any support may be used so long as it is an inorganic or organic filler, or a polymer material having a property of yielding a solution or suspension by a pheromone at a temperature not lower than the melting point of the polymer material used.

Examples of the polymer material used as the support include poly-ε-caprolactone, ethylene-vinyl acetate copolymer, ethylene-ethyl acrylate copolymer, polyvinyl chloride, polyvinyl acetate, polymethacrylate, a cellulose derivative such as cellulose acetate butyrate, polystyrene, polyethylene, polypropylene, polybutadiene, and polyisoprene.

There are no limitations on the filler used as the support, and any filler may be used so long as it is an inorganic or organic one. The filler may for example be an inorganic filler including, for example, a metallic powder such as an iron powder, silicic acid, silicate, alumina, calcium carbonate, barium sulfate, gypsum, a slate powder, mica, kaolin, clay, talc, graphite, carbon black, and cement; or an organic filler such as linter and wood flour. Since a pheromone retention capability varies depending on the types of these fillers as well as the sizes and shapes of their particles, preferred is one having an oil absorption of not smaller than 15 ml, more preferably not smaller than 30 ml. This is because the larger the oil absorption is, the higher the pheromone retention capability is, which makes it easy to mix and disperse a pheromone(s). Here, the oil absorption is based on a test method prescribed in JIS K5105-1965, and refers to an amount of oil than is capable of being kneaded with respect to 100 g of a filler.

It is preferred that such support be used in an amount of 2 to 50% by mass, more preferably 5 to 40% by mass, per 100% by mass of a total amount of the pheromone substance and the support. An amount of smaller than 2% by mass may be insufficient in terms of retaining the pheromone; an amount of greater than 50% by mass makes it impossible to control the release of the pheromone, whereby releasing over a long period of time may not be possible. Any one of these supports may be used alone, or a number of them may be used in a mixed manner. Further, in order to make production easy, it is more desired that there be used a polymer material-based support and a filler-based support in a mixed manner.

Figure 10A:
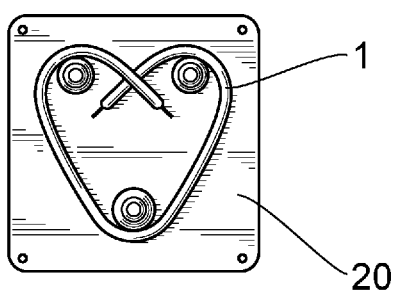
FIG. 10A is a schematic diagram showing a jig for use in a bending and turning processing, particularly one used for forming a tomato shape.
Figure 10B:
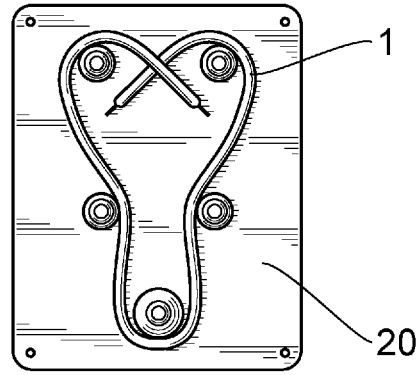
FIG. 10B is a schematic diagram showing a jig for use in the bending and turning processing, particularly one used for forming a bell pepper shape.
Figure 10C:
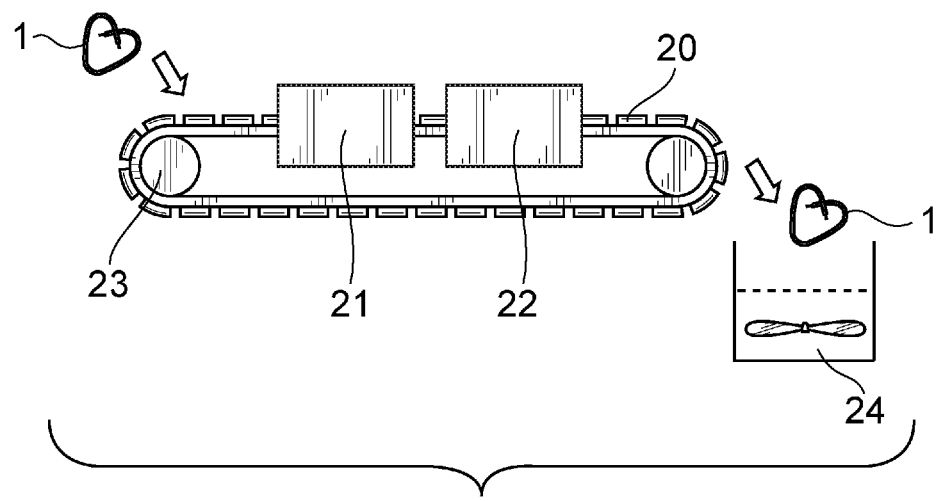
FIG. 10C is a schematic diagram illustrating a processing flow.

Described hereunder is a method for processing the polymer tube or rod into a given shape. There are no particular limitations on the processing method; for example, there may be used a fixing jig 20 having multiple protrusions provided at proper locations on a plate as shown in FIGS. 10A and 10B, and the polymer tube or rod with both ends already sealed can then be fixed on such fixing jig. As shown in FIG. 10C which is a schematic diagram, this fixing jig(s) 20 is continuously conveyed via a conveyer belt 23, where each fixing jig 20 will spend a given amount of time passing through a warm water bath 21 before spending a given amount of time passing through a cooling water bath 22, after which the polymer tube or rod will come off the fixing jig and then be air-dried by an air-drying device 24, thereby enabling mass production. Although depending on the polymer material employed, the temperature of the water in the warm water bath 21 is preferably 70 to 90° C. Further, although depending on the polymer material employed, the temperature of the water in the cooling water bath 22 is preferably 5 to 25° C.

As another processing method(s), there are for example processing methods employing a heat gun or a heat box, where processing is carried out by utilizing thermocouple.

For example, in the case of a tube or rod made of polybutylene succinate or polybutylene succinate adipate, the tube or rod with both ends sealed may be bended and turned into a desired shape, heated to 80° C. (melting point is 110° C.), and then cooled while maintaining its shape, whereby a given shape can thus be imparted to the tube or rod.

WORKING EXAMPLES

The present invention is described in detail hereunder with reference to working and comparative examples; however, the present invention shall not be limited to the following working examples.

Working Example 1

Using an extruder (die temperature 130° C.), there was produced an elongated tube made of polybutylene succinate (BioPBS FZ91PB by Mitsubishi Chemical Corporation), in which two tubes having an inner diameter of 1.40 mm, a wall thickness of 0.40 mm and an outer diameter of 2.20 mm were aligned in parallel.

This elongated tube was cut into a length of 20 m, and one end of such elongated tube was then inserted into a solution prepared by adding 1% by mass of 2,6-di-tert-butyl-4-methylphenol (antioxidant) and 1% by mass of 2-(5-chloro-2-hydroxy-3-tert-butyl-5-methylphenyl)-p-cresol (ultraviolet absorber) to (Z)-8-dodecen-1-yl acetate as a sex pheromone of *Grapholita molesta*, followed by using a pump to perform suction from the opposite end of the elongated tube so as to allow the tube to be filled with the sex pheromone solution.

After subjecting the 20 m elongated tube filled with the sex pheromone to ultrasonic sealing (amplitude 28 µm, pressure 117.6 kPa, sealing time 1.2 sec) at an interval of 20 cm, the sealed portion(s) was cut by a cutter to obtain 1,000 sustained-release pheromone preparations made of polymer tubes whose entire length is 200 mm each.

Figure 11:
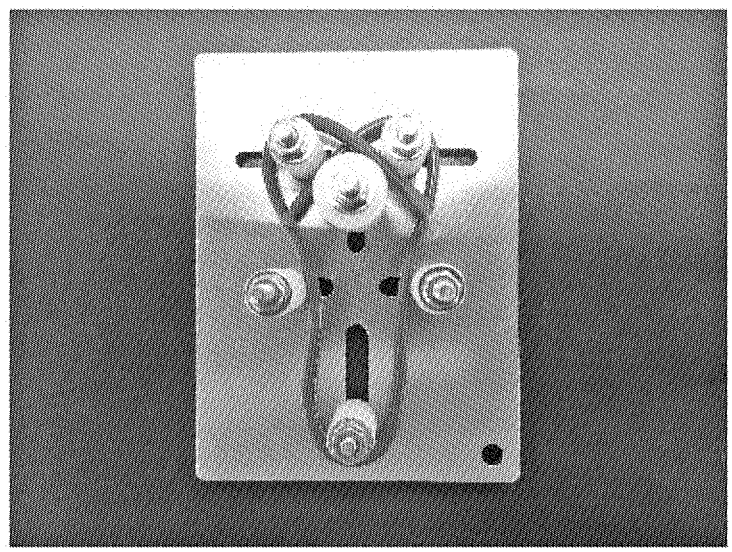
FIG. 11 is a photograph showing the appearance of a jig employed in a working example 1, which is for use in the bending and turning processing.
Figure 12:
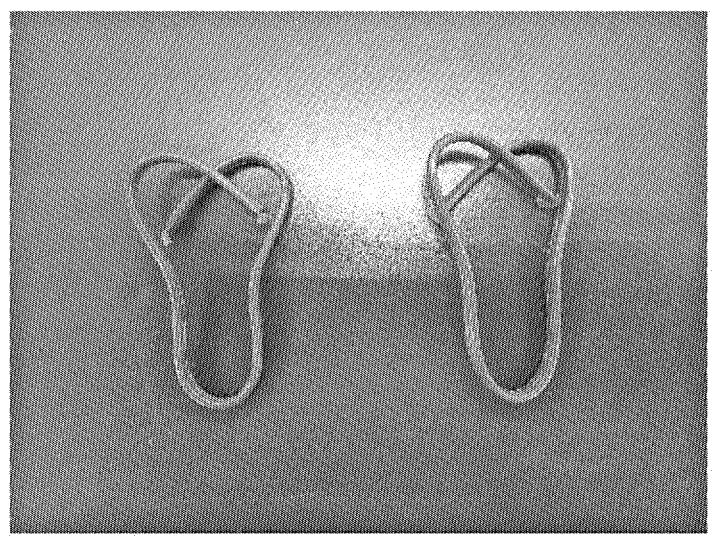
FIG. 12 is a photograph showing the appearances of sustained-release pheromone preparations obtained in the working example 1.

As shown in FIG. 11, with regard to the sustained-release pheromone preparation thus obtained, the polymer tube was then bended and turned by six rollers whose positions were movable and was fixed to the plate before dipping the same in a warm water of 80° C. for 15 sec and then putting it in a water bath of 20° C. to obtain a sustained-release pheromone preparation shown in FIG. 12. The sustained-release pheromone preparation thus produced had one closed space in the front view, and was not crossed in the side view. Further, the curvature radius of the arc at the closed part of the sustained-release pheromone preparation produced was 9.0 mm, the angle of the arc was 160°, and the linear distance from the top point of the arc to the crossover point was 55 mm. As a result of measuring the repelling force of this sustained-release pheromone preparation by the method illustrated in FIGS. 5A and 5B, the repelling force was found to be 0.508 N. In the case of this sustained-release pheromone preparation, simply by holding, with fingers, the arc portion formed by bending the tube in an arc, and then pressing a tree branch against the crossover point located between the two sealed ends, the branch was able to enter the closed space part formed by the arc portion and the two ends, and once the tree branch had entered the closed space part, the preparation never disengaged from the tree branch as the two sealed ends were now overlapped at the crossover point.

Working Example 2

Using an extruder (die temperature 130° C.), there was produced an elongated tube made of a resin obtained by mixing polybutylene succinate (BioPBS FZ91PB by Mitsubishi Chemical Corporation) and polybutylene succinate adipate (BioPBS FD92PB by Mitsubishi Chemical Corporation) at a ratio of 80:20 on a mass basis, in which two tubes having an inner diameter of 1.07 mm, a wall thickness of 0.40 mm and an outer diameter of 1.87 mm were aligned in parallel.

This elongated tube was cut into a length of 100 m, and one end of such elongated tube was then dipped into a solution prepared by adding 2% by mass of 2,6-di-tert-butyl methylphenol (antioxidant) and 2% by mass of 2-(5-chloro-2-hydroxy-3-tert-butyl methylphenyl)-p-cresol (ultraviolet absorber) to (E,Z)-7,9-dodecadien-1-yl acetate as a sex pheromone of European grapevine moth, followed by using a pump to perform suction from the opposite end of the elongated tube so as to allow the tube to be filled with the sex pheromone solution.

After subjecting the 100 m elongated tube filled with the sex pheromone to ultrasonic sealing (amplitude 28 µm, pressure 117.6 kPa, sealing time 1.0 sec) at an interval of 200 mm, the sealed portion(s) was cut by a cutter to obtain 5,000 sustained-release pheromone preparations made of polymer tubes whose entire length is 200 mm each.

The sustained-release pheromone preparation obtained was then formed in a similar manner as the working example 1. The formed sustained-release pheromone preparation had one closed space in the front view, and was not crossed in the side view. Further, the curvature radius of the arc at the closed part of the sustained-release pheromone preparation produced was 9.0 mm, the angle of the arc was 160°, and the linear distance from the top point of the arc to the crossover point was 55 mm. As a result of measuring the repelling force of the obtained sustained-release pheromone preparation by the method illustrated in FIGS. 5A and 5B, the repelling force was found to be 1.105 N. In the case of this sustained-release pheromone preparation, simply by holding, with fingers, the arc portion formed by bending the tube in an arc, and then pressing a tree branch against the crossover point located between the two sealed ends, the branch was able to enter the closed space part formed by the arc portion and the two ends, and once the tree branch had entered the closed space part formed by the arc portion and the two ends, the preparation never easily disengaged from the tree branch as the two sealed ends were now overlapped at the crossover point.

Comparative Example 1

Using an extruder (die temperature 130° C.), there was produced an elongated tube made of a resin obtained by mixing polybutylene succinate (BioPBS FZ91PB by Mitsubishi Chemical Corporation) and polybutylene succinate adipate (BioPBS FD92PB by Mitsubishi Chemical Corporation) at a ratio of 80:20 on a mass basis, in which two tubes having an inner diameter of 0.58 mm, a wall thickness of 0.30 mm and an outer diameter of 1.18 mm were aligned in parallel.

This elongated tube was cut into a length of 100 m, and one end of such elongated tube was then dipped into a solution prepared by adding 2% by mass of 2,6-di-tert-butyl- 4-methylphenol (antioxidant) and 2% by mass of 2-(5-chloro-2-hydroxy-3-tert-butyl-5-methylphenyl)-p-cresol (ultraviolet absorber) to (E,Z)-7,9-dodecadien-1-yl acetate as a sex pheromone of European grapevine moth, followed by using a pump to perform suction from the opposite end of the elongated tube so as to allow the tube to be filled with the sex pheromone solution.

After subjecting the 100 m elongated tube filled with the sex pheromone to ultrasonic sealing (amplitude 28 μm, pressure 98.0 kPa, sealing time 0.8 sec) at an interval of 200 mm, the sealed portion(s) was cut by a cutter to obtain 5,000 sustained-release pheromone preparations made of polymer tubes whose entire length is 200 mm each.

The sustained-release pheromone preparation obtained was formed by a similar method as the working example 1. The shape of the sustained-release pheromone preparation formed was analogous to that of the sustained-release pheromone preparation of the working example 2.

The curvature radius of the arc at the closed part of the sustained-release pheromone preparation produced was 9.0 mm, the angle of the arc was 160°, and the linear distance from the top point of the arc to the crossover point was 55 mm. As a result of measuring the repelling force of the obtained sustained-release pheromone preparation by the method illustrated in FIGS. 5A and 5B, the repelling force was found to be 0.308 N. In the case of this sustained-release pheromone preparation, by holding, with fingers, the arc portion formed by bending the tube in an arc, and then pressing a tree branch against the crossover point located between the two sealed ends, the branch was able to enter the arc portion; however, due to the small repelling force at the bended and turned portion, the preparation disengaged and fell from the branch by wind pressure and shaking of the branch.

Operation Time

Working Example 3

An installation operation was conducted in an apple orchard to study a workability for installing the sustained-release pheromone preparation obtained in the working example 1. The operation conducted was one in which in a 10-are apple orchard where apple trees were planted at an interval of 6 m, the operators installed three sustained-release pheromone preparations on each apple tree (installation of 99 preparations/10 ares). The installation was possible with one hand; and the time it took for one person to install 99 preparations was 50 min, which indicated that the operation time was able to be shortened as compared to when using a polyethylene-made annular preparation.

Comparative Example 2

Using an extruder (die temperature 130° C.), there was produced an elongated tube made of polybutylene succinate (BioPBS FZ91PB by Mitsubishi Chemical Corporation), in which two tubes having an inner diameter of 1.40 mm, a wall thickness of 0.40 mm and an outer diameter of 2.20 mm were aligned in parallel.

This elongated tube was cut into a length of 20 m, and one end of such elongated tube was then dipped into a solution prepared by adding 1% by mass of 2,6-di-tert-butyl methylphenol (antioxidant) and 1% by mass of 2-(5-chloro-2-hydroxy-3-tert-butyl methylphenyl)-p-cresol (ultraviolet absorber) to (Z)-8-dodecen-1-yl acetate as a sex pheromone of *Grapholita molesta*, followed by using a pump to perform suction from the opposite end of the elongated tube so as to allow the tube to be filled with the sex pheromone solution.

After subjecting the 20 m elongated tube filled with the sex pheromone to ultrasonic sealing (amplitude 28 μm, pressure 117.6 kPa, sealing time 1.2 sec) at an interval of 200 mm, the sealed portion(s) was cut by a cutter to obtain 1,000 sustained-release pheromone preparations made of polymer tubes whose entire length is 200 mm each.

As is the case with the working example 3, there was conducted an operation in which the operators installed three such obtained sustained-release pheromone preparations on each apple tree in a 10-are apple orchard where apple trees were planted at an interval of 6 m (installation of 99 preparations/10 are). As for this type of preparation, the annular preparation had to be expanded before allowing a branch to pass therethrough, and the time it took for one person to install 99 preparations was 70 min.

Fall Rate Measurement

At first, 97 parts by mass of pellets of polybutylene succinate adipate (BioPBS FD92PB by Mitsubishi Chemical Corporation) and 3 parts by mass of a solution prepared by adding 1% by mass of 2,6-di-tert-butyl-4-methylphenol (antioxidant) and 1% by mass of 2-(5-chloro-2-hydroxy-3-tert-butyl-5-methylphenyl)-p-cresol (ultraviolet absorber) to (Z)-8-dodecen-1-yl acetate as a sex pheromone of *Grapholita molesta*, were mixed by a V-type mixer to the extent that blocking of the pellets (i.e. a phenomenon where the pellets stick together and agglomerate) was no longer observed, followed by extruding the polymer from a die (die temperature 130° C.) having a Φ 4.1 circular hole, and then passing it through water baths (first water bath: length 2 m, temperature 60° C.; second water bath: length 5 m, temperature 15° C.) to cool and solidify the same so as to obtain a molded rod of a cylindrical shape. By reeling this rod at a constant speed, there was produced a molded product as an elongated polymer rod impregnated with the sex pheromone. With the reeling speed being set constant, by adjusting the number of revolutions of an extruding screw of an extruder, the diameter (outer diameter) of the cylinder can be arbitrarily changed. When the constant reeling speed was set to 60 m/min, and the number of revolutions in an extruder with a Φ 50 mm screw was set to 12.8 RPM, there was obtained an elongated pheromone-containing rod having an outer diameter of 1.0 mm. Likewise, when the reeling speed was set to 60 m/min, and the number of revolutions of the screw was set to 26.8 RPM, the outer diameter became 1.5 mm. The outer diameter became 2.0 mm when the number of revolutions was 47.4 RPM. Further, a rod-shaped molded product having an outer diameter of 2.5 mm was obtained as a result of performing molding with the diameter of the circular hole of the die being changed to Φ 6, the reeling speed being 40 m/min, and the screw speed being 52.2 RPM. Furthermore, a rod-shaped molded product having an outer diameter of 3.0 mm was obtained as a result of performing molding with the diameter of the hole of the die being Φ 6, the reeling speed being 30 m/min, and the number of revolutions of the screw being 54.0 RPM. Furthermore, a rod-shaped molded product having an outer diameter of 5.0 mm was obtained as a result of performing molding with the diameter of the hole of the die being Φ 6, the reeling speed being 18 m/min, and the number of revolutions of the screw being 57.5 RPM.

Next, using an extruder (die temperature 130° C.), there was produced an elongated tube made of polybutylene succinate adipate (BioPBS FD92PB by Mitsubishi Chemical Corporation), where there were prepared a type of polymer tube (with one tube) and a type of polymer tube (with two tubes aligned in parallel) as described in Table 1.

Each of these elongated tubes was cut into a length of 20 m. One end of the tube in the case of the configuration with one tube was, whereas one ends of both tubes in the case of the configuration with two tubes aligned in parallel were then inserted into a solution prepared by adding 1% by mass of 2,6-di-tert-butyl-4-methylphenol (antioxidant) and 1% by mass of 2-(5-chloro-2-hydroxy-3-tert-butyl-5-methylphenyl)-p-cresol (ultraviolet absorber) to (Z) dodecen-1-yl acetate as a sex pheromone of *Grapholita molesta*, followed by using a pump to perform suction from the opposite end(s) of the tube so as to allow the tube to be filled with the sex pheromone solution.

After subjecting the 20 m elongated tube filled with the sex pheromone to ultrasonic sealing (amplitude 28 μm, pressure 117.6 kPa, sealing time 1.2 sec) at an interval of 20 cm, the sealed portion(s) was cut by a cutter to obtain, for each type of the polymer tube, 100 sustained-release pheromone preparations made of polymer tubes whose entire length is 200 mm each.

The obtained sustained-release pheromone preparations made of the polymer rods and tubes were then each formed in a similar manner as the working example 1. The sustained-release pheromone preparation thus formed had one closed space in the front view, and was not crossed in the side view. Further, the curvature radius of the arc at the closed part of the sustained-release pheromone preparation produced was 9.0 mm, the angle of the arc was 160°, and the linear distance from the top point of the arc to the crossover point was 55 mm. Table 1 shows the repelling forces of the sustained-release pheromone preparations that were measured by the method illustrated in FIGS. 5A and 5B.

Figure 6:
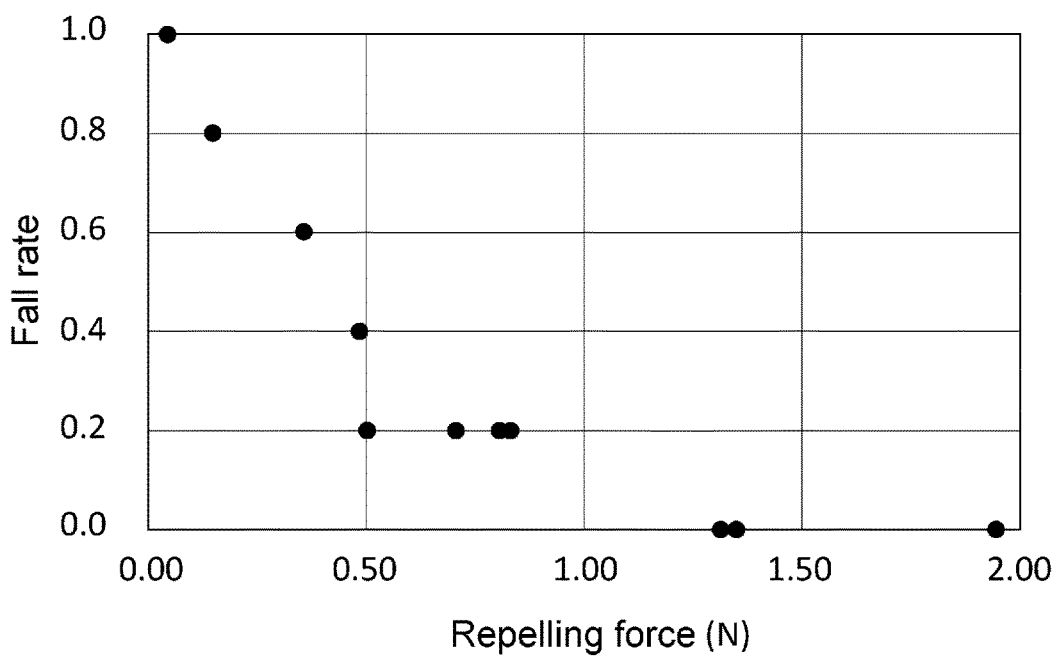
FIG. 6 is a diagram showing a correlation between the repelling force and a fall rate.

Next, there was used a fixed log member having a diameter of 15 mm and a length of 400 mm, and having protrusions with a thickness of 2 mm and a length of 15 mm provided thereon at an interval of 5 cm; five such sustained-release pheromone preparations were then installed between these protrusions. After exposing the hanging sustained-release pheromone preparations to a wind speed of 25 m/sec for 60 sec, the number of the sustained-release pheromone preparations that had fallen was counted to obtain a fall rate. The results thereof are shown in Table 1 and FIG. 6. These results indicate that a fall rate of not higher than 0.2 (one out of five fell; or none of them fell) was exhibited by the sustained-release pheromone preparations having a repelling force of not smaller than 0.5 N when measured by the above measurement method, and that these sustained-release pheromone preparations were thus superior in installation stability.

TABLE 1

Fall rate measurement
(Curvature radius: 9.0 mm, Linear distance: 55 mm, Angle: 160°)

| Shape | Outer diameter (mm) | Wall thickness (mm) | Repelling force (N) | Fall rate |
|---|---|---|---|---|
| Round rod | Φ 1.0 | | 0.042 | 1 |
| | Φ 1.5 | | 0.148 | 0.8 |
| | Φ 2.0 | | 0.706 | 0.2 |
| | Φ 2.5 | | 1.316 | 0 |
| | Φ 3.0 | | 1.944 | 0 |
| | Φ 5.0 | | 2.655 | 0 |
| One tube | Φ 2.0 | 0.30 | 0.484 | 0.4 |
| | Φ 2.0 | 0.50 | 0.502 | 0.2 |
| Two tubes aligned in parallel | Φ 3.0 | 0.30 | 0.364 | 0.6 |
| | Φ 3.0 | 0.50 | 1.348 | 0 |
| | Φ 1.5 | 0.30 | 0.355 | 0.6 |
| | Φ 1.5 | 0.50 | 0.806 | 0.2 |
| | Φ 2.0 | 0.30 | 0.832 | 0.2 |
| | Φ 2.0 | 0.50 | 1.310 | 0 |

DESCRIPTION OF THE SYMBOLS

1 Polymer tube
2 Sealed end
3 Pheromone substance
5 Crossover point
6 Space
7 Top point of arc
8 Branch
10 Sustained-release pheromone preparation
11 Polymer rod
20 Fixing jig
21 Warm water bath
22 Cooling water bath
23 Conveyer belt
24 Air-drying device
28 Metal chuck
29 Force gauge
31 Small hook attachment
81 Mandrel
82 Conduit
83 Feeder
84 Die
85 Polymer tube member
A Pheromone liquid
B Polymer material

What is claimed is:

1. A sustained-release pheromone device comprised of at least one pheromone substance-containing polymer tube with both ends sealed or pheromone substance-containing polymer rod, wherein
   (a) a closed space formed in a front view by bending in an arc and crossing the polymer tube or polymer rod, and the sustained-release pheromone device is not crossed in a side view;
   (b) a curvature radius established by bending in an arc and crossing the polymer tube or polymer rod is 4 to 17 mm;
   (c) a linear distance from a top point of an arc formed by bending the polymer tube or polymer rod in an arc to a crossover point that is closest to the top point is 25 to 70 mm;
   (d) a repelling force when opening the crossover point to establish a clearance of 20 mm in the front view is 0.5 N or larger; and
   (e) both ends of said polymer tube or polymer rod are disposed within the closed space.

2. The sustained-release pheromone device according to claim 1, wherein an angle of the arc formed by bending the polymer tube or polymer rod in an arc is 100 to 200°.

3. The sustained-release pheromone device according to claim 1, wherein the polymer tube or polymer rod is made of polycaprolactone, polybutylene succinate, polyethylene succinate, polybutylene adipate, polyglycolic acid, polylactic acid, polyhydroxy alkanoate, or a copolymer or blended polymer of these polymers.

4. The sustained-release pheromone device according to claim 2, wherein the polymer tube or polymer rod is made of polycaprolactone, polybutylene succinate, polyethylene succinate, polybutylene adipate, polyglycolic acid, polylactic acid, polyhydroxy alkanoate, or a copolymer or blended polymer of these polymers.

5. A sustained-release pheromone device comprised of at least one pheromone substance-containing elongated cylindrical member being sealed at both a first and second end of said member, having a first end portion and second end portion proximate to said first and second ends, said member having a length and a middle portion along said length, wherein
   (a) said member being bent in an arc in said middle portion thereof and said first and second end portions crossing each other to form a crossover point;
   (b) a curvature radius established by said arc at said middle portion being 4 to 17 mm;
   (c) a linear distance from a top point of said arc to said crossover point being 25 to 70 mm;
   (d) a repelling force when opening the crossover point that is closest to the arc to establish a clearance of 20 mm in the front view being 0.5 N or larger; and
   (e) both ends of said elongated cylindrical member are disposed within the closed space.

6. The sustained-release pheromone device according to claim 5, wherein an angle at the intersection of tangent lines to the arc at two end portions of the arc is 100 to 200°.

7. The sustained-release pheromone device according to claim 5, wherein the elongated cylindrical member is a hollow tube made of at least one member selected from the group consisting of polycaprolactone, polybutylene succinate, polyethylene succinate, polybutylene adipate, polyglycolic acid, polylactic acid, polyhydroxy alkanoate, or copolymers thereof, said hollow tube containing at least one sustained-release pheromone.

8. The sustained-release pheromone device according to claim 6, wherein the elongated cylindrical member is comprised of at least one sustained-release pheromone in mixture with at least one member selected from the group consisting of polycaprolactone, polybutylene succinate, polyethylene succinate, polybutylene adipate, polyglycolic acid, polylactic acid, polyhydroxy alkanoate, or copolymers thereof.

9. The sustained-release pheromone device according to claim 1, wherein the device comprises only one crossover point of said polymer tube or polymer rod.

10. The sustained-release pheromone device according to claim 5, wherein the device comprises only one crossover point of said elongated cylindrical member.

11. The sustained-release pheromone device according to claim 1, wherein said polymer tube is bent into an arc at multiple locations along said tube to form a closed space in the shape of a bell pepper.

12. The sustained-release pheromone device according to claim 1, wherein said polymer tube is bent into an arc at multiple locations along said tube to form a closed space in the shape of a tomato.

13. The sustained-release pheromone device according to claim 5, wherein said polymer tube is bent into an arc at multiple locations along said tube to form a closed space in the shape of a bell pepper.

14. The sustained-release pheromone device according to claim 5, wherein said polymer tube is bent into an arc at multiple locations along said tube to form a closed space in the shape of a tomato.

* * * * *